Feb. 5, 1952 J. M. WASHBURN 2,584,243
LUBRICATING SYSTEM
Filed Oct. 5, 1948 3 Sheets-Sheet 1

Inventor:
John M. Washburn
By Church & Church
His Attorneys

Feb. 5, 1952     J. M. WASHBURN     2,584,243
LUBRICATING SYSTEM

Filed Oct. 5, 1948     3 Sheets-Sheet 2

Feb. 5, 1952     J. M. WASHBURN     2,584,243
LUBRICATING SYSTEM

Filed Oct. 5, 1948     3 Sheets-Sheet 3

Inventor:
John M. Washburn
By Church & Church
His Attorneys

Patented Feb. 5, 1952

2,584,243

UNITED STATES PATENT OFFICE 2,584,243

LUBRICATING SYSTEM

John M. Washburn, Hartford, Conn., assignor to The Merrow Machine Company, Hartford, Conn., a corporation of Connecticut Application October 5, 1948, Serial No. 52,871

12 Claims. (Cl. 184—6)

This invention relates to improvements in lubricating systems and particularly to the lubrication of precision bearings in high speed machinery.

In many types of modern machinery precision bearings are employed extensively to facilitate operation at extremely high speeds. To protect these bearings it is vitally important that they be supplied with sufficient but not excessive lubrication and the primary object of the present invention is to provide a lubricating arrangement or system capable of insuring substantially continuous and accurate lubrication of precision machinery of the character referred to.

Another object is to provide a lubricating system whereby lubricant from a common source of supply can be apportioned to different bearings in the machine in accordance with the requirements of each bearing.

Still another object is to provide a lubricating system in which the lubricant is distributed or directed to the bearings of a machine from a point above the level of the bearings, the lubricant being supplied to said point from a body of lubricant below the bearings by means responsive to the speed of operation of the machine in the sense that the rate at which the lubricant is elevated from said body of lubricant to the upper level will vary with the speed at which the machine is operated.

More specifically, the invention contemplates a lubricating system comprising a receptacle for a body of fluid lubricant located below the bearings to be lubricated, and a series of lubricant collecting compartments above the level of the bearings with distributing ducts for directing lubricant from said compartments to the bearings by gravity and means for feeding lubricant from said body of fluid to said compartments, said feeding means preferably comprising a rotatable member having a tapered, upwardly flaring bore whose lower end is immersed in the supply body of lubricant and whose upper end terminates at a point above the lubricant collecting compartments with means for causing lubricant discharged from the upper end of said bore to be deposited in the several compartments from which it can drain to the bearings. The capacity of each of these compartments to collect lubricant discharged from said rotatable member can be made proportionate to the lubricant requirements of respective bearings.

A still further object is to provide easily adjusted means for varying or controlling the quantity of lubricant collected in a compartment independently of the rate at which the lubricant is fed by said rotating member.

Still another object is to control the quantity of lubricant collected in the compartments by providing means for returning excess lubricant from said compartments to the main supply body of lubricant.

With these and other objects in view, the invention consists in certain details of construction and combinations and arrangements of parts, all as will hereinafter be more fully described and the novel features thereof particularly pointed out in the appended claims.

Figure 1:
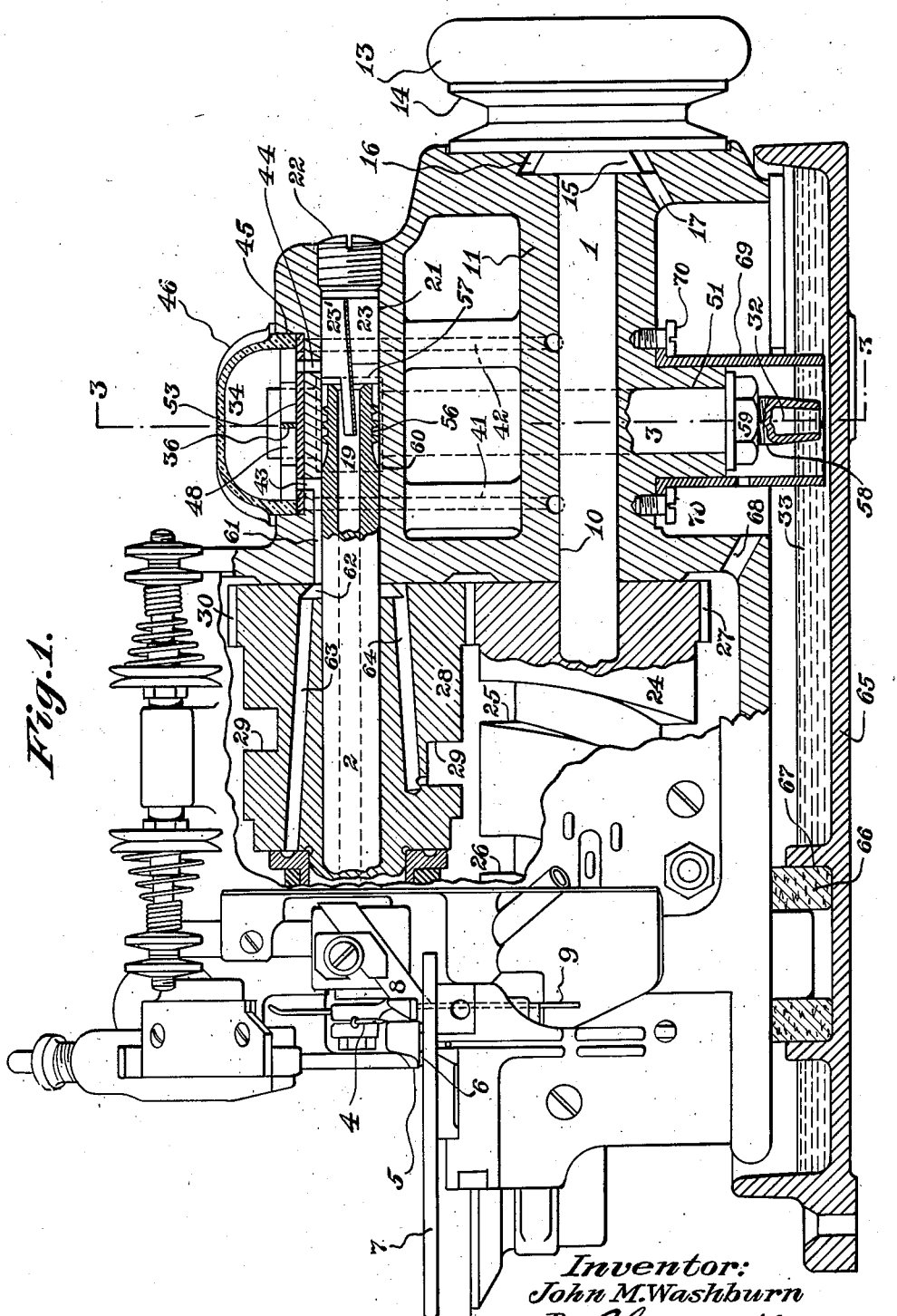
Figure 1 is a front side elevational view with parts shown in section, of a high speed sewing machine illustrating one embodiment of the present invention.

Stated broadly, the lubricating system of the present invention preferably consists essentially of a rotatable member having a longitudinal bore therein of increasing cross-section, or tapering from one end to the other with the reduced end of the bore positioned in a source of fluid lubricant and at its opposite end terminating in a chamber preferably subdivided into a plurality of collecting compartments, so that, by revolving said member, lubricant will be fed from said body of lubricant through the bore to the larger end of the latter and discharged at that point by centrifugal force in said chamber where it will be collected in the several compartments from whence it is fed to the desired points by distributing ducts communicating with the individual compartments. The component parts of the present system are preferably so arranged that the lubricant can be elevated from the source of supply to collecting compartments disposed at a level above the surfaces to be lubricated so that lubricant can flow by gravity from the compartments to those surfaces. For instance, the main body of lubricant or the source of supply can be located below the surfaces to be lubricated and the collecting compartments located above those surfaces and the lubricant distributed from said compartments by gravity through the distributing ducts. While the rotatable member can be revolved by any desired actuating means, it is preferred, in incorporating the system in a machine, that said member be rotated or driven from a shaft constituting a structural part of said machine. For this reason, a high speed sewing machine comprising shafts 1 and 2 has been adopted for purposes of illustration and in a construction such as this the rotatable member, indicated at 3, may be driven from one of those shafts, for instance shaft 2. The stitch forming mechanism and other portions of the sewing machine which constitute no part of the present invention need not be described nor illustrated in detail herein for a complete understanding of the present invention, particularly the broader principles of the invention, but reference is made to United States Letters Patent No. 1,983,631, granted to Joseph M. Merrow, December 11, 1934, wherein the sewing instrumentalities and other portions of the mechanism are shown and described in detail. For purposes of the present disclosure it is deemed sufficient to state that the machine illustrated includes a needle 4 of the stitching implements, presserfoot 5, feed dog 6 and work support or needle plate 7 of the feeding mechanism and upper and lower cutters 8 and 9 of the trimming mechanism. The movable elements are actuated through parts associated with a main driving shaft 1 supported in a long bearing 10 in the machine frame 11. At the exterior of the machine frame the end of the shaft 1 is provided with a handwheel 13 which constitutes a belt pulley groove 14 and oil slinger 15, the latter being within an undercut frame recess 16 provided in its lower portion with a drain duct 17. Journaled in the machine frame 11 above shaft 1 is a second or upper shaft 2 formed with a longitudinally extending duct 19 for conducting oil to bearings included in mechanism for actuating the respective carriers of needle 4 and upper trimmer cutter 8. The bore 21 constituting the journal or bearing for shaft 2 extends through to the end of the machine frame where it is closed by a plug screw 22, thereby forming a recess 23 within which is secured a trough 23' for receiving oil to be delivered through duct 19 as previously mentioned. While the loopers which cooperate with needle 4 are not shown, part of their actuating mechanism is illustrated in Fig. 1 and includes a cam 24 secured on shaft 1 and cam 28 secured on shaft 2, the cam 24 being provided with cam grooves 25 and 26 and with gear teeth 27, while cam 28 is provided with a cam groove 29 and gear teeth 30. In accordance with this usual construction, the gear teeth of the two cams mesh with one another so that the cams rotate in unison, together with their supporting shafts 1 and 2, respectively.

As previously indicated, the rotatable member 3 is provided with the tapering bore 32 with the reduced end of the bore of said member submerged in a body of fluid lubricant 33 and with the other end of said rotatable member located in a chamber 34 which is subdivided by partitions 36 into a plurality of compartments 37, 38, 39 and 40, formed with outlets or distributing ducts 41, 42, 43 and 44, respectively. In the present instance the rotatable tubular member 3 is in an upright or perpendicular position with the source of lubricant supply or body of fluid lubricant 33 located below the surfaces to be lubricated and with the collecting compartments 37, 38, 39, 40 located above at least the major portion of those surfaces. However, it will be appreciated that the rotatable member 3 need not necessarily occupy a perpendicular position nor need the body of supply lubricant, the collecting compartments and the surfaces to be lubricated occupy this particular relationship to one another as various other arrangements are entirely possible so far as concerns this broader aspect of the invention. In this connection, while oil may be referred to herein as the particular lubricant, it will also be understood that the term fluid lubricant, wherever used, is to be interpreted to include any form of lubricant which will function as hereinafter described in more detail.

Figures 2, 3:
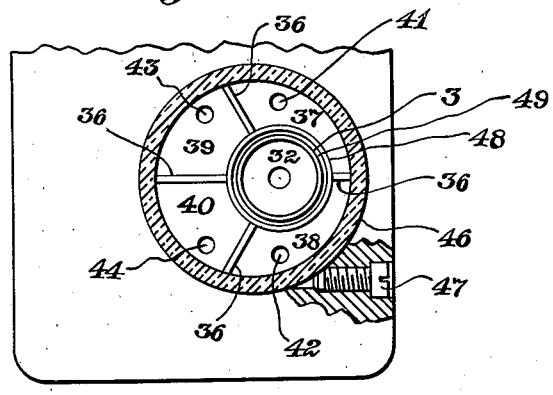
Figure 2 is a fragmentary sectional view on the line 2—2 of Fig. 3.
Figure 3 is a transverse vertical sectional view on the line 3—3 of Fig. 1.

The chamber 34 which, in the present instance, is partly formed by a depression 45 countersunk in the machine frame, is provided with a closure preferably in the form of a transparent dome 46 removably secured in place as by a screw 47. As thus far described, it will be seen that by revolving the rotatable member 3, oil in the supply body 33 will be thrown by centrifugal force against the surface of the bore 32 and, by reason of the inclination of the surface of the bore with respect to the center of rotation of said member, the oil will be fed, in this instance, upwardly through said bore to the upper end of member 3 at which point it will be discharged laterally by the action of centrifugal force. The inner surface of dome 46, particularly the side wall thereof, constitutes a baffle or barrier against which the discharged oil impinges and cascades downwardly into the several collecting compartments within the chamber. The side wall portions of dome 46 may also constitute one side wall of the several compartments in chamber 34 and the opposite walls of the several compartments may be formed by an annular member 48. The walls of the compartments, formed by annulus 48 are, of course, lower than the opposite compartment walls formed by dome 46, and the end of the rotatable member 3 extends above the annulus 48 but is located in opposition to walls of the compartments formed by dome 46. This is necessarily so because the oil discharged from the upper end of the rotatable member 3 must be free to move laterally to impinge against the outer walls of the pockets so as to fall or cascade down into the open-top compartments. However, the relative heights of the two opposite walls of the compartments, that is, the walls formed by dome 46 and the annulus 48 may be varied to control the capacities of the several individual compartments for purposes which will later appear. For this reason, the annulus 48 may be described as constituting a barrier which regulates the capacities of the collecting compartments in the sense that it is the lowest wall of the compartments and if oil is delivered to the compartments faster than it is distributed through the respective ducts of the compartments, the excess oil will overflow this annulus or barrier 48 into a space 49 between the annulus and member 3 and into a recess 50 forming an enlargement of the bore 51 which latter constitutes the bearing in the main frame for the rotating member 3. This recess 50 is provided at its lower end with a drain 52 for returning such excess oil to the main supply body 33, as best illustrated in Fig. 3. Preferably the dome 46 seats on a plate 53 inserted in the depression 45 and this plate is formed with an opening 54 through which the rotatable member extends in spaced relation to annulus 48 to form the space 49 through which the excess oil drains into the recess 50.

The bore 51, constituting the bearing for the rotatable member 3 and the bore 21 for shaft 2 intersect one another and at this point of intersection of the two bores shaft 2 is provided with a spiral gear 56 which meshes with another spiral gear 57 on the member 3 whereby said member is rotated when the machine is placed in operation. To hold shaft 3 against longitudinal movement in its bearing 51 it is formed with a reduced lower end 58 threaded to receive a collar nut 59. Thus, upward thrust on the shaft is resisted by collar nut 59 while downward thrust is resisted by a shoulder 60 formed in the bore 51 of the main frame at a point below the spiral gear 57.

In the particular machine shown oil from compartment 39 will flow through the distributing duct 43 to a communicating duct 61 extending along the bore 21 for shaft 2 and merging into a circular undercut recess 62 adapted to deliver oil to ducts 63 and 64 formed in the cam 28. Duct 63 extends the full length of the cam 28 to deliver oil to various bearings at the end of the cam adjacent the needle and cutter actuating parts, while duct 64 extends only part way lengthwise of cam 28 and delivers the oil to the cam groove 29 in the face of said cam. To insure passage of oil to the delivery end of ducts 63 and 64, the latter may be formed divergent from the center of rotation of the cam 28, or with their inlet ends adjacent recess 62 located nearer the axis of rotation of said cam than their other or delivery ends, so that the desired flow of lubricant is effected by centrifugal force when the cam is revolved. The ducts 41, 42 of collecting compartments 37, 38, respectively, extend downwardly through the machine frame to the long bearing 10 of shaft 1 and the distributing duct 44 for oil collecting compartment 40 extends from that compartment to the recess 23 above trough 23'. To maintain an adequate amount of oil around the lower end of the rotatable member 3 a suitable container, such as the flanged base 65 which constitutes more or less a tray, may be provided and the machine frame 11 can be supported within this base upon resilient supports such as cork plugs 66 in retaining pockets 67 formed on the base. Oil distributed through ducts 63, 64, in cam 28 drains back through duct 68 to the source of supply 33 and oil supplied to bearing 10 of shaft 1 is returned through the drain duct 17. As the bottom of the machine frame 11 is supported above the level of oil supply 33, the lower end of rotatable member 3 must project beyond the bottom of the frame so as to be immersed in that oil supply when the machine is mounted on the base 65 and to protect this protruding end of member 3 when the machine is removed from the base there is a sleeve 69 secured to the machine frame as by screws 70.

It will be appreciated that the disposition of the partitions 36 in chamber 34 may be varied to form compartments of different oil collecting capacity. This is particularly advantageous where certain surfaces in the machine will require a larger quantity of lubricant than others because in such instances the partitions can be so arranged as to form compartments of comparatively large collecting capacity for supplying those surfaces which require larger quantities of lubricant and to form other compartments of less collecting capacity for the surfaces which require smaller quantities of lubricant. In other words, the chamber may be said to be subdivided into a plurality of proportioning compartments for collecting oil to be delivered to the several bearing surfaces. Also, as previously mentioned, the overflow from the several compartments can be varied by altering the height of the lowest wall of the compartment, in this instance, the wall formed by the annular member 48. There is, in this connection, the limitation that this wall must not extend above the adjacent end of the rotating member 3 where the oil is discharged from the bore of that member. It will also be appreciated that the present system has the advantage of regulating the feed of lubricant from the main source of supply to the collecting compartments and distributing ducts depending upon the speed at which the machine is operated or upon the extent to which the member 3 is immersed in the body of lubricant 33. For instance, as the speed of rotation of member 3 increases, the movement of oil through the member under the influence of centrifugal force will be augmented so that the faster the machine is operated the greater will be the rate of movement of oil from the source of supply to the collecting compartments. Again, the deeper the member 3 is immersed in the lubricant, the greater will be the volume of lubricant delivered to the compartments. However, in view of the fact that the collecting capacities of the individual compartments are also accurately controlled or regulated, it will be seen that regardless of the rate of flow of the lubricant to those pockets, the quantity of lubricant reaching the surfaces to be lubricated is controlled because, if an excess quantity of oil is delivered to the collecting pockets, the excess will drain off and be returned through recesses 49, 50, and drain duct 52 to the source of supply.

Figure 5:
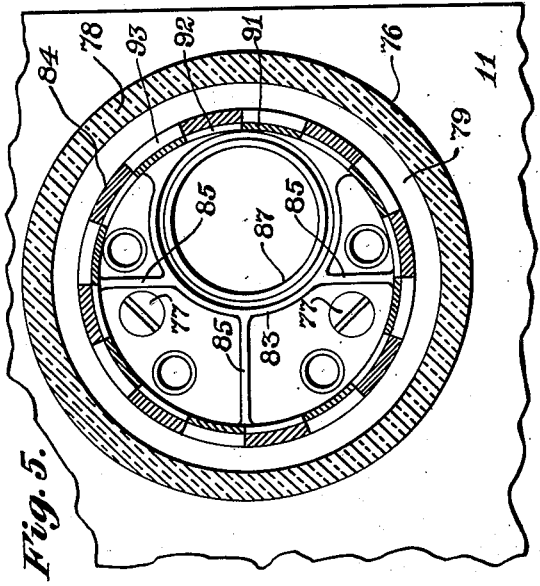
Figure 5 is a sectional view on the line 5—5 of Fig. 4.
Figure 4:
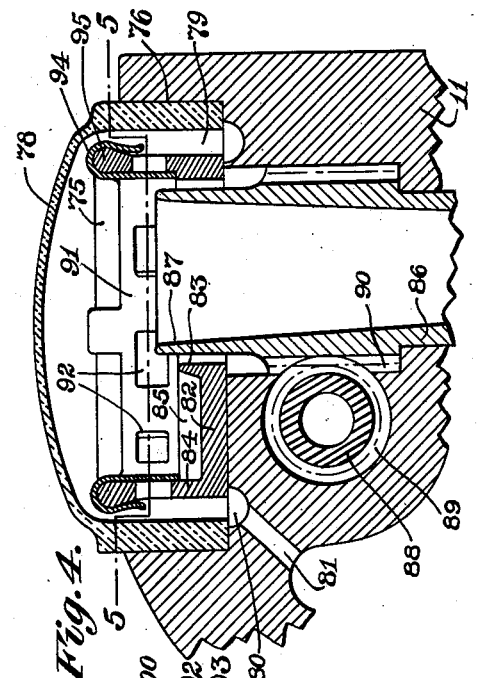
Figure 4 is a fragmentary sectional view similar to Fig. 3 but showing a modified form of construction for the lubricant distributing chamber and compartments.
Figure 7:
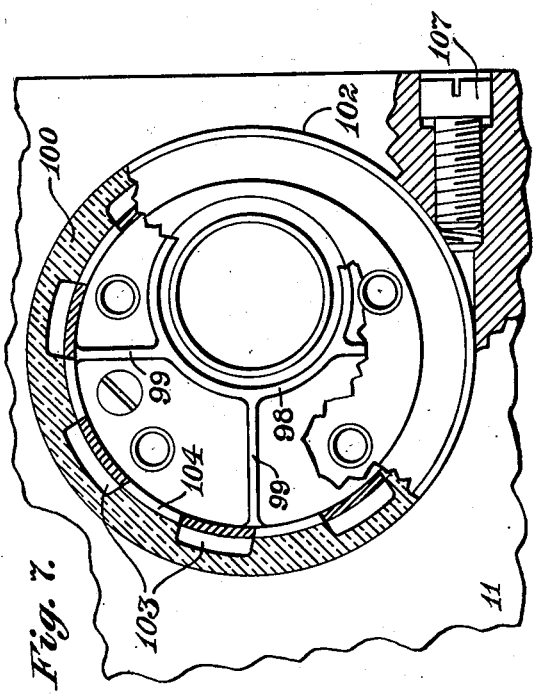
Figure 7 is a top view, partly in section on the line 7—7 of Fig. 6 and with certain parts broken away for purposes of illustration.
Figure 6:
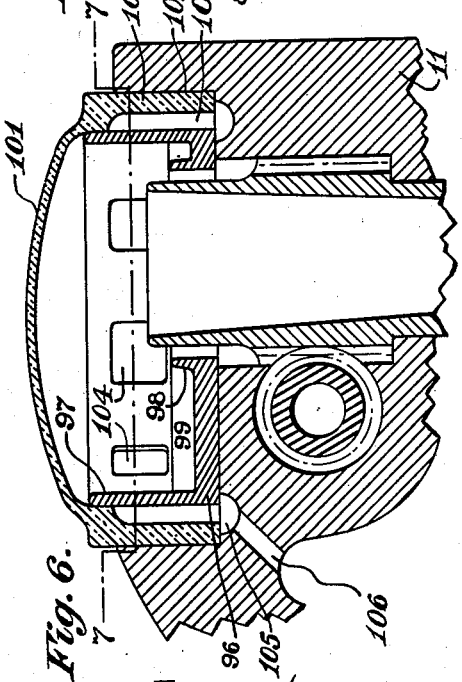
Figure 6 is a view similar to Fig. 4 showing still another modification of the lubricant distributing chamber.

In some instances it is desirable to control the amount of lubricant directed into the collecting compartments and in such instances means may be employed as illustrated in Figs. 4 and 5, or as in the modified form of such control means shown in Figs. 6 and 7. Referring to Figs. 4 and 5, the compartment forming element 75 is secured within countersink 76 of the machine frame as by screws 77. Also secured within the countersink is the enclosing transparent dome 78 concentric to the compartment forming element and separated therefrom by an annular space 79 below which there is an annular groove 80 formed in the machine frame and provided with a drain duct 81. Compartment element 75 is cup-like in form and comprises a bottom 82 with an inner upstanding flange 83 which constitutes the lower wall of the lubricant collecting compartments, and outer flange 84 which forms part of the high outer wall of the compartments and compartment forming partitions 85. For discharging lubricant in a plane above wall 83 but below the top of flange 84 shaft 86 is provided with a tapered wall 87 and is arranged to be driven from shaft 88 through spiral gears 89 and 90. For purposes that will presently appear, the outer wall of each compartment is essentially of sectional construction in that in addition to the outer flange 84 of the element 75, said wall also comprises an annulus 91 which has a sleeve fit in or on said flange 84. This annulus 91 is provided with openings 92 for one or more of the lubricant controlling compartments adapted to be adjusted with respect to corresponding openings 93 which are provided in flange 84. In other words, the outer wall of the compartments serve as a baffle against which the liquid impinges and drains to the compartments and said wall or baffle is divided longitudinally in a vertical plane into the two ported sections 84 and 91, the arrangement being such that rotative adjustment of the annulus 91 relative to flange 84 serves to place the respective openings or ports of the two sections either in partial or complete registry or wholly out of registry. In the latter arrangement the entire outer wall is effective as a baffle for deflecting into a compartment the entire amount of lubricant discharged from the rim of shaft bore 87, but if the openings 92, 93, are more or less in registry with one another the amount of lubricant deflected into the compartment will be correspondingly reduced, depending upon the size of the openings formed by the alined ports in the baffle surface. That is, moving the ports 92, 93, into registry, partially or complete, reduces the effective area of the baffle surface. Means are provided for holding annulus 91 in frictional engagement with flange 84 to thereby maintain the annulus against displacement from the desired adjustment. Such means may comprise upstanding resilient clips 94 which are adapted to snap over a bead 95 on the rim of flange 84.

In the modified form of means illustrated in Figs. 6 and 7 for controlling the amount of lubricant directed into a collecting compartment the element 96 comprising said compartment is cup-like in form having a relatively high flange 97 which constitutes a section of the outer wall of the compartments, a lower inner flange or wall 98 and compartment forming partitions 99. Sleeved upon the flange 97 is the skirt 100 of a transparent dome 101 which is in peripheral engagement with the wall of the machine frame countersink 102. In this instance, this skirt 100 constitutes the second section of the outer wall of the compartments and the inner surface of this skirt is provided with uniformly spaced channels 103 adapted to be moved into and out of registry with openings 104 in the high outer flange section 97 of the compartment wall. Thus, rotative adjustment of dome 101 serves to locate the channels 103 with respect to openings 104 thereby altering the effective surface or baffle area of the wall. When the channels 103 are in registry with the openings 104 oil passing through said openings into said channels can escape to an annular groove 105 formed in the machine frame and provided with a drain duct 106. In other words, rotative adjustment of the dome 101 serves to place respective openings and channels in partial or complete registry, or wholly out of registry to thereby vary the amount of lubricant which will drain into the compartments of element 96. Any particular adjustment of dome 101 may be secured against accidental displacement by a set screw 107.

It will be appreciated that so far as this control of the amount of lubricant draining into a compartment is concerned, the means for directing a stream or supply of lubricant against the outer baffle wall of the compartments is not limited to the specific form of lubricant feeding means illustrated herein. It will also be appreciated that by controlling the amount of lubricant deposited in a compartment by varying the surface area or baffle effect of the compartment wall, an adjustment that can be made easily and speedily, it is unnecessary to alter the rate at which the lubricant is fed against said wall.

This is a continuation in part of applicant's application, Serial No. 596,655, filed May 30, 1945, and now abandoned.

What is claimed is:

1. In a system for lubricating surfaces of a machine, a body of fluid lubricant below said surfaces, a group of lubricant collecting compartments above said surfaces, lubricant distributing ducts extending from said compartments for directing lubricant toward said surfaces, two opposite walls of said compartments being common to the group with one of said walls higher than the other, a member having a tapered bore therein extending from a point below the surface of said body of lubricant to a point above the lower wall of said compartments but in opposition to the higher wall thereof, the bore in said rotatable member flaring upwardly, means for rotating said member whereby lubricant impelled against the flaring surface of said bore by centrifugal force will be fed to the upper end of said bore and discharged therefrom by centrifugal force into said compartments, the said lower wall of said compartments determining the capacity of the latter, and a return passage into which excess lubricant overflowing said lower wall is discharged and returned to said body of lubricant.

2. In a system for lubricating bearing surfaces of a machine, a body of fluid lubricant, a lubricant collecting container having an outer peripheral wall and an opening in its bottom defined by an upstanding flange constituting an inner peripheral wall, partitions extending between said walls subdividing said container into a plurality of oil collecting compartments, lubricant distributing ducts extending from said compartments, a rotatable member having an axial bore tapering from one end to the opposite end of said member with the end of said member having a reduced bore submerged in said body of lubricant and the opposite end projecting through the opening in said container in spaced relation to the inner peripheral wall thereof with the last mentioned end of said member terminating above said inner peripheral wall but below said outer peripheral wall of the lubricant container, means for rotating said rotatable member whereby oil is fed from said body of lubricant through the bore of said member and discharged from the enlarged end of said bore by centrifugal force and impinges against the outer peripheral wall of said container, and a drain duct communicating with the space between said rotatable member and the inner peripheral wall of said container for returning oil from said space to said body of lubricant.

3. A lubricating device including in combination, a lubricant receiving chamber having an outer peripheral wall and an opening in its bottom defined by an upstanding flange constituting an inner peripheral wall, partitions extending between said walls subdividing said chamber into a plurality of oil collecting compartments, lubricant distributing ducts extending from said compartments, a rotary element extending through the opening in the chamber bottom in spaced relation to the inner peripheral wall thereof and operable to centrifugally discharge lubricant above the top of the inner peripheral wall and against said outer peripheral wall, and a drain duct communicating with the space between the rotatable member and the inner peripheral wall of the chamber for conducting oil away from said space.

4. A lubricating device including in combination, a group of lubricant collecting compartments, lubricant distributing ducts extending from said compartments, two opposite walls of said compartments being common to the group with one of said walls higher than the other, a rotary element positioned adjacent to but in spaced relation with respect to the exterior of the lower wall and from which lubricant is discharged against the higher wall, the level at which the lubricant is discharged from said rotary element being located between the upper edges of said two walls whereby the discharged lubricant will impinge against the higher wall, and a drain duct communicating with the space between said rotatable element and said lower wall for conducting lubricant away from said space.

5. In a lubricating system, the combination of an oil collecting compartment, means for directing a stream of oil against the surface of one wall of said compartment for deflecting said oil into said compartment, said wall being divided vertically longitudinally thereof into two sections, an opening in each of said wall sections, said sections being movable relatively to one another to adjust said openings into and out of registry with each other and vary the effective area of said wall for deflecting oil into said compartment.

6. In a lubricating system, the combination of a lubricant distributing chamber, of partitions subdividing said chamber into a plurality of open-topped lubricant collecting compartments each having opposed walls of different height, and means for forcibly directing lubricant against the higher wall of each compartment, the higher wall having two sections movable relative to one another to vary the surface area of the higher wall of certain of said compartments.

7. In a lubricating system, the combination of a lubricant distributing chamber, partitions subdividing said chamber into a plurality of open-topped lubricant collecting compartments each having opposed walls of different height, means for forcibly directing lubricant against the higher wall of each compartment, the higher wall of certain of said compartments being composed of two ported sections movable relatively to each other to vary the degree of registration of the ports in the respective sections.

8. In a lubricating system, the combination with a lubricant distributing chamber, of partitions subdividing said chamber into a plurality of open-topped lubricant collecting compartments, a rotary element for centrifugally discharging lubricant above said compartments, and an annular baffle positioned above said compartments against which lubricant discharged from the rotary element impinges and drains into said compartments, said baffle comprising one annular element having a series of openings, a second annular element sleeved upon the first element and having a series of openings, said annular elements being relatively adjustable to effect variable register of the respective series of openings therein to thereby vary the effective deflecting surface of the baffle and thus to regulate the amount of centrifugally discharged lubricant deflected into the compartments.

9. A machine including a lubricating system, having in combination, a machine frame provided with a countersink with drainage passages communicating therewith, a cup-like element having an aperture in its bottom seated on the bottom wall of the countersink and comprising a relatively high outer flange, a low inner flange surrounding said aperture, and compartment forming partitions extending from the outer flange to the inner flange, a rotary tubular shaft extending through said aperture for centrifugally discharging lubricant above said compartments, an annulus sleeved upon said outer flange of the cup-like element and rotatively adjustable thereon, said annulus and outer flange each having a series of openings therein, which upon adjustment of the annulus on said outer flange may be brought into variable degrees of registry to thereby vary the effective surface forming a baffle for deflecting lubricant into the compartments, and an enclosing dome seated in the countersink with its inner side wall spaced from the cup-like element to provide for flow to drainage passages in the machine frame of such lubricant as may be discharged through the openings in said baffle.

10. A machine including a lubricating system, having in combination, a machine frame provided with a countersink and drainage passages communicating therewith, a cup-like element having an aperture in its bottom wall and seated upon the bottom wall of the countersink, said element comprising a relatively high outer wall, a low inner wall surrounding said aperture, and compartment forming partitions extending from the outer wall to the inner wall, a rotary tubular shaft extending through said aperture for centrifugally discharging lubricant above said compartments, an enclosing dome rotatively seated in the countersink with the skirt of the dome in peripheral engagement with the outer wall of the cup-like element, said wall and skirt having respectively a series of openings and a series of channels, the latter communicating with drainage passages in the machine frame and being opposed to the outer wall, and means for permitting rotative adjustment of the dome effective to bring into variable degrees of register the channels and openings to thereby vary the effective surface forming a baffle for deflecting lubricant impinging thereupon into the compartments.

11. In a lubricating system, the combination of an oil distributing chamber, partitions in said chamber forming an open-topped lubricant collecting compartment, a baffle above said compartment and having two sections at one side of said compartment, and means for forcibly directing a stream of oil toward said baffle, the sections of said baffle being movable relative to one another to adjust the surface area against which the oil impinges for controlling the quantity of oil delivered into said compartment by drainage off said baffle.

12. A lubricating device including in combination, a lubricant receiving chamber having an outer peripheral wall and an opening in its bottom defined by an upstanding flange constituting an inner peripheral wall, partitions extending between said walls subdividing said chamber into a plurality of oil collecting compartments, lubricant distributing ducts extending from said compartments, a rotary element extending through the opening in the chamber bottom in spaced relation to the inner peripheral wall thereof and operable to centrifugally discharge lubricant above the top of the inner peripheral wall against said outer peripheral wall, means for varying the surface area of said outer peripheral wall for controlling the quantity of oil delivered into said compartments, and a drain duct communicating with the space between the rotatable member and the inner peripheral wall of the chamber for conducting oil away from said space.

JOHN M. WASHBURN.

REFERENCES CITED

The following references are of record in the file of this patent:

UNITED STATES PATENTS

| Number | Name | Date |
|---|---|---|
| 1,591,346 | Tushaus | July 6, 1926 |
| 1,766,001 | Planche | June 24, 1930 |
| 2,164,294 | Mahan | June 27, 1939 |